May 26, 1925.  
C. MELDAU  
SELF CLOSING CHECK VALVE  
Filed Sept. 23, 1922  
1,539,054
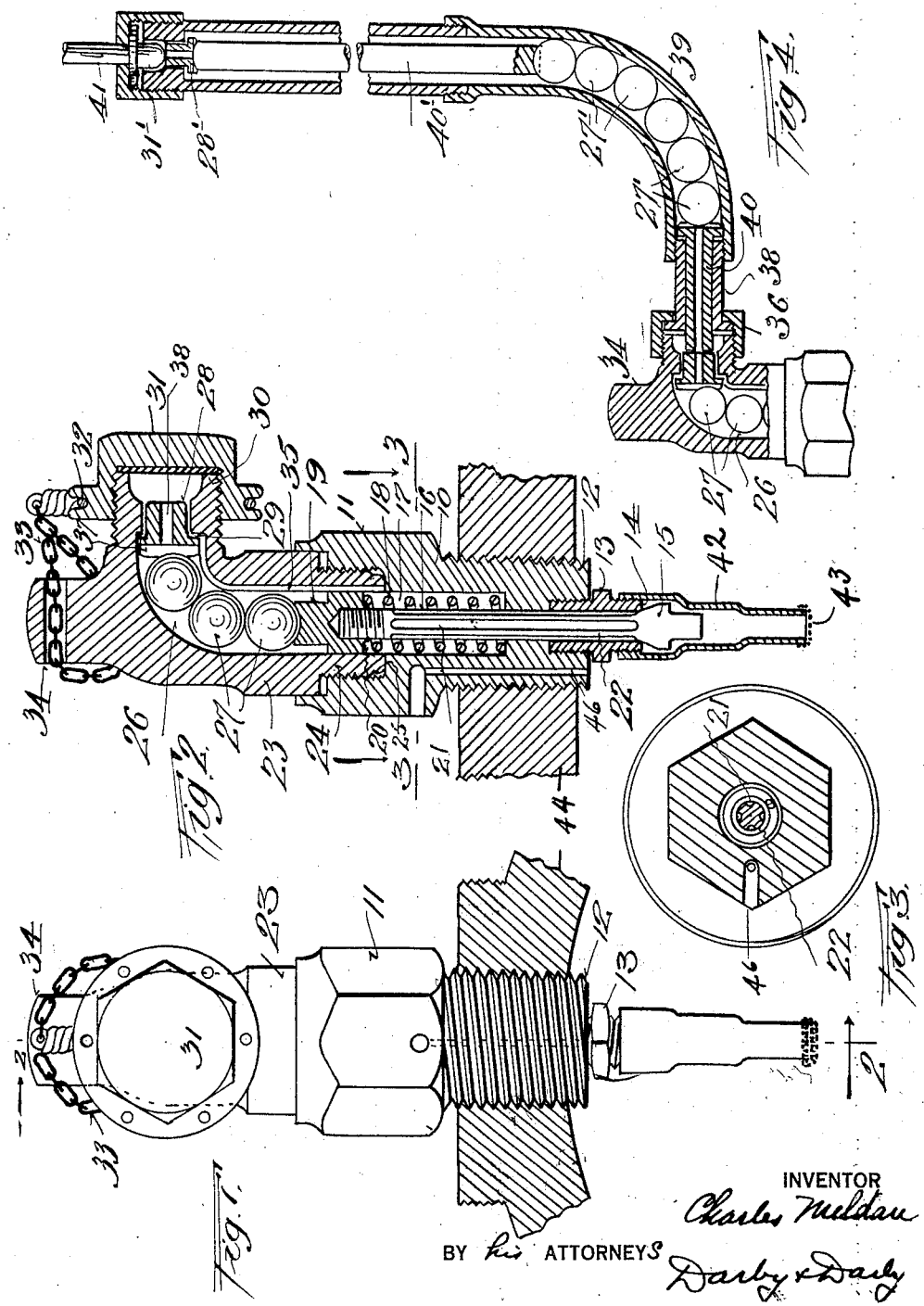
INVENTOR  
Charles Meldau  
BY his ATTORNEYS  
Darby & Darby Patented May 26, 1925.

1,539,054

UNITED STATES PATENT OFFICE.

CHARLES MELDAU, OF NEW YORK, N. Y.

SELF-CLOSING CHECK VALVE.

Application filed September 23, 1922. Serial No. 589,966.

*To all whom it may concern:*

Be it known that I, CHARLES MELDAU, a citizen of the United States, residing at New York, in the county of Bronx and State of New York, have made a certain new and useful Invention in Self-Closing Check Valves, of which the following is a specification.

My invention relates more particularly to improvements in high pressure check valves, and includes in its objects the production of a self-closing valve structure which is reliable in operation, simple and rugged in construction, and which is operable from any desired point distant from the valve; another object includes the provision of a valve structure which may be readily inspected without disassembling the valve proper and wherein the valve seat is without the valve body; a further object embraces a valve construction wherein the valve will open and close in straight line movements, that is, the valve head will be constantly reseated in substantially the same position, and no turning or twisting movements will be given to the valve stem or valve head in opening and closing; a still further object embraces a valve construction wherein the valve releasing part protects the valve holding part and is separable therefrom without opening the valve or impairing its effectiveness.

Other objects will appear hereinafter, and I attain these objects by the construction illustrated in the accompanying drawing, in which—

Fig. 1 is a view in elevation showing the valve fitted to the neck of any suitable gas container;

Fig. 2 is a sectional view taken on lines 2—2 of Fig. 1;

Fig. 3 is a sectional view taken on lines 3—3 of Fig. 2; and

Fig. 4 is a sectional view of one form of extension for operating the valve at a distance and to thus deliver the gas.

Like numerals refer to similar parts throughout the several views.

In the form herein illustrated as an example merely of an embodiment of one form of my invention, the valve holding part or essential valve body 10 comprises an enlarged nut head 11, and a screw threaded stem 12. A bore extends centrally through the valve body, and the lower part of this bore is enlarged into a screw threaded recess for engaging a valve plug 13. This plug is provided with a valve seat 14 for engaging the valve head 15, the stem 16 of which extends through the valve plug and into the spring recess 17, wherein a rigid spring 18 seated against the valve nut 19, normally maintains the valve head in closed position. The valve nut 19 is provided with a seat 20, for engaging one end of the valve spring, and the valve stem is provided with parallel grooves 21, to provide free passage for the gas when the valve is opened. It will be observed that the valve stem 16 is provided with bearing surfaces 22 for engaging the sides of the bore through the threaded stem 12.

Within the nut head and surrounding the valve nut 19, is a screw threaded recess, which forms a seat for the threaded extension 24 of casing 23 of the valve releasing part and operating member. The extension 24 of said member is rigidly screwed into said recess and fits securely against the shoulder seat 25 of the nut head. Casing 23 is provided with a central bore 26 for receiving the valve releasing balls 27 and the pressure disk 28. Bore 26 terminates in an enlarged mouth with a restricted neck 29 against the shoulders of which the pressure disk is loosely held when the valve is closed. The mouth end of casing 23 is provided with screw threads 30 for receiving a sealing cap 31, or for attaching a gas releasing and control coupling nut 31', or its equivalent connection coupling 36. The sealing cap may be rotatively held in a collar 32 by means of a chain 33, which is fastened to a protective projection 34 of casing 23.

A channel 35 within bore 26 provides for a free passage of the gas. This channel communicates, through slot 37 in the pressure disk 28, with a central bore 38 in said disk, and forms an unobstructed gas passage. When it is desired to open the valve to obtain gas, for example, cap 31 is removed and the control coupling 31' carrying the regulator tube 41 is screwed on in place. This causes the rounded end of tube 41 to press on disk 28 which is moved inwardly and its motion is transmitted through the releasing balls to the valve nut, valve stem and head to thereby open the valve. A turn of the coupling will release the pressure and the valve will immediately be reseated aided by the spring as well as by the gas pressure.

While, for the purpose of illustration, I have shown three releasing members 27 in the form of balls, it is obvious that any number of balls, or equivalent members, may be used, and in all cases will the valve stem and valve head be moved in straight lines and no displacing twists will be imparted thereto.

It is further obvious that by my construction gas may be discharged at any desired angle, and at the same time the valve may be regulated from this distant point by an extension of my releasing and control mechanism. In Fig. 4 I have illustrated one type of extension as an illustration of extending the principles of my invention. In this extension the coupling nut 36 carries a coupling tube 38 to which may be connected an extension tube 39 of any desired shape and length. If a plurality of changes of direction are desired, a plurality of pressure direction changing members will then be employed at the points where changes of direction occur. In the present form of extension I have shown but one change in direction of tube 39, and at this point I provide any suitable number of balls 27, or equivalent members. Within the tube 38 there is fitted an elongated pressure disk 40, similar in construction to disk 28, on which one of said members presses. An extension rod 40' may be used in place of the balls or equivalent members for straight line extension, and this extension may be connected directly to disk 28' for regulating the valve by varying the pressure of member 41 and coupling 31'.

A protective tube 42, provided with a suitable screen 43, protects the valve from within against impurities or rust particles, and the entire valve structure may be screwed into a neck 44 of any suitable gas container, as an oxygen or an acetylene cylinder, for which my valve is well adapted. A safety vent 46 filled with low melting composition may be provided.

While I have disclosed a specific embodiment of my invention, I do not thereby desire to be understood as having thus limited myself unduly, as various modifications falling wholly within the spirit and scope of my invention will undoubtedly present themselves to those versed in the art. What I claim, therefore as new and useful and desire to secure by Letters Patent, is:

1. A check valve comprising a valve releasing member and a valve holding member with a valve extension member therein between, said members being provided with a central bore therethrough to form a continuous passage, a valve seat and a valve head located without said valve holding member but obstructing one end of said passage, a freely movable disk located in the other end of said passage, and contacting members in said extension passage, said contacting members being disconnected and freely movable to each other at varying angles for moving said valve head in rectilinear directions.

2. A check valve comprising a valve releasing member and a valve holding member with a valve extension member therein between, said members being provided with a central bore therethrough to form a continuous passage, a valve seat and a valve head located without said valve holding member but obstructing one end of said passage, a freely movable disk located in the other end of said passage, and disconnected contacting members in the passage of said extension movable freely to each other for moving said valve head in rectilinear directions at an angle to the rectilinear motion of said disk.

3. In a high pressure self-closing pressure valve, a valve holding part having a spring seat therein, a spring in said seat and a valve stem in said spring, a valve stem nut on one end of said stem and a valve head at the other, a valve plug having a valve seat for said head located beyond the holding part, a valve extension on said holding part, a freely movable pressure transmitting disk in the free end of said extension and pressure transmitting members in said valve extension between said valve stem nut and said pressure transmitting disk.

In testimony whereof I have hereunto set my hand on this 18th day of September, A. D., 1922.

CHARLES MELDAU.